United States Patent
Baker (10) Patent No.: US 10,359,215 B2
(45) Date of Patent: Jul. 23, 2019

(54) HELIOSTAT ARRAY INTENSITY AND POLARIZATION TRACKING

(71) Applicant: James Baker, Alhambra, CA (US)

(72) Inventor: James Baker, Alhambra, CA (US)

(73) Assignee: EDISUN MICROGRIDS, INC., Pasadena, CA (US)

( * ) Notice: Subject to any disclaimer, the term of this patent is extended or adjusted under 35 U.S.C. 154(b) by 68 days.

(21) Appl. No.: 15/231,669

(22) Filed: Aug. 8, 2016

(65) Prior Publication Data

US 2017/0198942 A1 Jul. 13, 2017

Related U.S. Application Data

(60) Provisional application No. 62/201,806, filed on Aug. 6, 2015.

(51) Int. Cl.
| | |
|---|---|
| *F24S 50/20* | (2018.01) |
| *H04N 5/247* | (2006.01) |
| *F24S 20/20* | (2018.01) |
| *F24S 23/70* | (2018.01) |

(52) U.S. Cl.
CPC ............. *F24S 50/20* (2018.05); *H04N 5/247* (2013.01); *F24S 20/20* (2018.05); *F24S 2023/87* (2018.05); *Y02E 10/47* (2013.01)

(58) Field of Classification Search
CPC ................................. F24J 2/38; H04N 5/247
USPC ........................................................ 126/573
See application file for complete search history.

(56) References Cited

U.S. PATENT DOCUMENTS

| | | | |
|---|---|---|---|
| 9,010,317 B1 * | 4/2015 | Gross | F24J 2/36 |
| | | | 126/573 |
| 2013/0021471 A1 * | 1/2013 | Waterhouse | F24J 2/38 |
| | | | 348/139 |

* cited by examiner

*Primary Examiner* — Steven B McAllister
*Assistant Examiner* — Allen R Schult
(74) *Attorney, Agent, or Firm* — Andrew Naglestad (57) ABSTRACT

A tracking system for a solar collector is disclosed. The tracking system includes at least two polarization cameras and a tracking controller configured to: determine orientations of maximal intensity of polarized light received from the at least one heliostat mirror; generate radial lines based on the orientation of maximal intensity of polarized light from the at least one heliostat mirror; determine a position of the sun based on an intersection of the radial lines; and re-orient the at least one heliostat mirror based on the determined position of the sun. In the preferred embodiment, the sun position may be determined based on radial lines corresponding to three or more cameras mounted around the receiver aperture.

20 Claims, 6 Drawing Sheets

HELIOSTAT ARRAY INTENSITY AND POLARIZATION TRACKING

CROSS-REFERENCE TO RELATED APPLICATION(S)

This application claims the benefit of U.S. Provisional Patent Application Ser. No. 62/201,806 filed Aug. 6, 2015, titled "HELIOSTAT ARRAY INTENSITY AND POLARIZATION TRACKING," which is hereby incorporated by reference herein for all purposes.

TECHNICAL FIELD

The invention relates to a solar tracking system. In particular, the invention relates to a solar collector that tracks the sun over the course of the day using a combination of light intensity, light polarization, light color, and/or light color ratios to determine the position of the sun in the sky.

BACKGROUND

There are a number of solar tracking systems that utilize small sensor arrays to determine the location of the sun in the sky relative to the solar tracker. The sensor arrays generally acquire and integrate the entire spectrum of light without differentiating between colors of light, which vary depending on the which direction the sensor is facing as well as the angular difference between the sensor and the sun. In addition, sensor arrays generally ignore the polarization of the incidence sunlight, which also varies depending on the direction the sensor is facing and its angular distance away from the sun. There is therefore a need for a solar tracking system that can determine its orientation based on a combination of light intensity, light polarization, light color, and/or light color ratios.

SUMMARY

The invention in some embodiments features a system and method for tracking the sun over the course of the day with a solar tracking system. The solar tracking system preferably comprises: at least two or four cameras including a first camera and a second camera; and a tracking controller configured to: determine orientations of maximal intensity of polarized light received from the at least one heliostat mirror; generate radial lines based on the orientation of maximal intensity of polarized light from the at least one heliostat mirror; determine a position of the sun based on an intersection of the radial lines; and re-orient the at least one heliostat mirror based on the determined position of the sun. In the preferred embodiment, the first camera and second camera are mounted on either side of the receiver where they are configured to capture images of polarized light received from the at least one heliostat mirror. Radial lines may be determined for each of a plurality of cameras mounted around the receiver aperture.

In addition to, or in the alternative, the tracking controller may be configured track the sun based on the intensity of light, preferably the ratio of white light intensity to blue light intensity. When two cameras are placed on either side of the receiver aperture, the ratio of white light to blue is substantially the same when the heliostat mirror is properly aligned. If not properly aligned, the tracking controller is configured to adjust the orientation of the at least one heliostat mirror to make the ratio the same. In some embodiments, the heliostats are oriented based on both light intensity ratios as well as polarization as described above.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
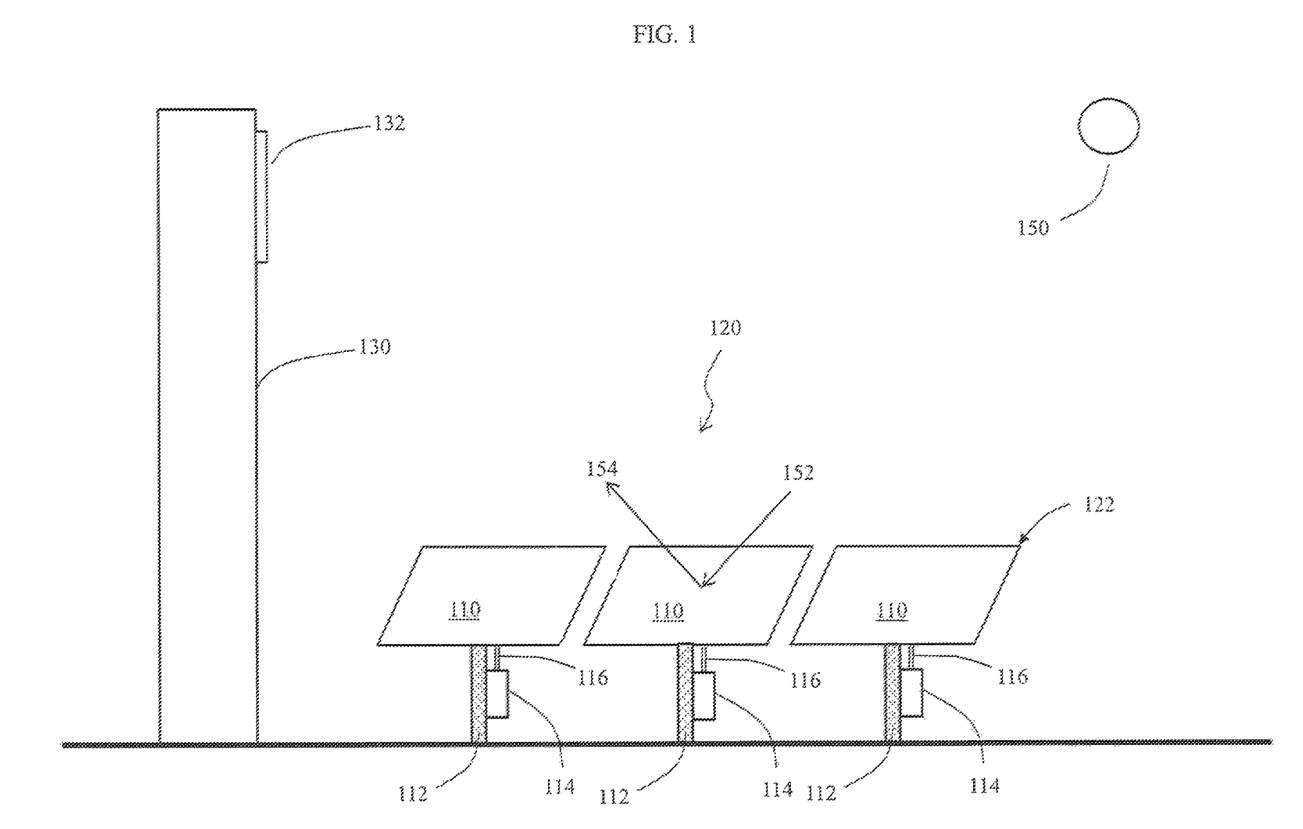
FIG. 1 is an elevation view of an array of heliostats and a receiver, in accordance with the preferred embodiment of the present invention.

The present invention pertains to a solar tracking system implemented with an array of heliostats and a solar thermal receiver that captures energy reflected from the heliostat array. Illustrated in FIG. 1 is an elevation view of heliostat array 120 and receiver 130 in accordance with a preferred embodiment. The heliostat array includes numerous identical heliostats 122 that are distributed in two dimensions in proximity to the receiver. Each heliostat 122 includes a mirror 110 pivotably coupled to a frame or stanchion 112 affixed to the ground and/or other heliostats. Each heliostat further includes a tracking controller 114 configured to determine the proper orientation of one or more mirrors through the day. A mirror is properly oriented when the incoming light 152 from the sun 150 is reflected to the solar thermal receiver 130, specifically the receiver aperture 132. If the actual orientation of the mirror differs from the proper orientation at that instant, the tracking controller energizes actuators 116 that drive the mirror to the proper orientation.

Figure 2:
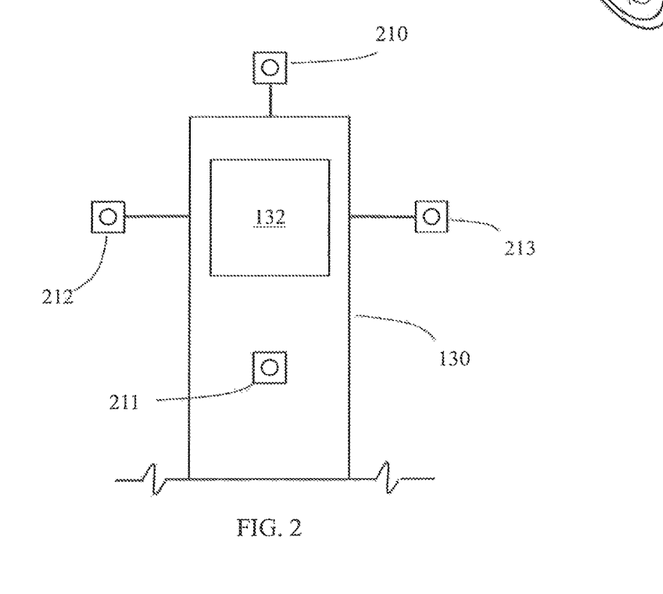
FIG. 2 is a front side view of the solar thermal receiver, in accordance with the preferred embodiment of the present invention.

Illustrated in FIG. 2 is an elevation view of the front side of the solar thermal receiver 130 and aperture 132 for receiving sunlight into the receiver. The receiver may further include absorbers that convert the sunlight to heat and transfer the heat to air, water, molten salt, or other working fluid (not shown). In the preferred embodiment, the receiver has mounted to it a portion of the solar tracking system, namely a plurality of cameras configured to capture images of the heliostat mirrors and the reflections therein. The left camera 212 and the right camera 213 are the same distance from the aperture. Similarly, the upper camera 210 and lower camera 211 are the same distance from the aperture. The cameras 210-213 may be any of a number of different types of two dimensional imagers including still cameras and video cameras. Image data observed in the multiple mirrors is combined to determine the elevation and azimuth angles of each heliostat mirror. In particular, image data from the left camera 212 and right camera 213 are combined to determine the azimuth angle of each heliostat mirror, while image data from the upper camera 210 and lower camera 211 are combined to determine the elevation angle of each mirror.

Figure 3:
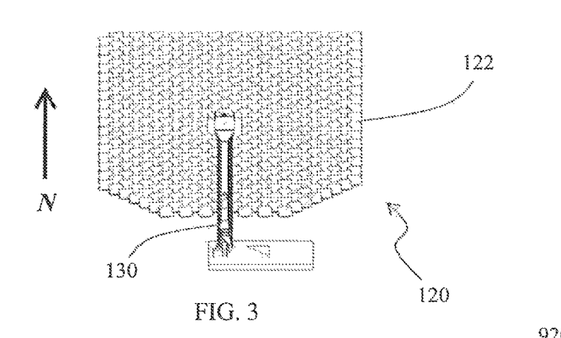
FIG. 3 is a perspective view of the array of heliostats and receiver, in accordance with the preferred embodiment of the present invention.

Illustrated in FIG. 3 is a perspective view of an exemplary array of heliostats and receiver. In this example, the array of heliostats is located in the northern hemisphere, and the heliostats are north of the receiver 130. The cameras 210-214, although not visible in this figure, are configured with a field of view sufficient to capture a complete image of all the heliostat mirrors 122 in the heliostat array 120. As explained below, the image data includes light intensity levels and/or polarization angles measured for each heliostat mirror.

Figure 4:
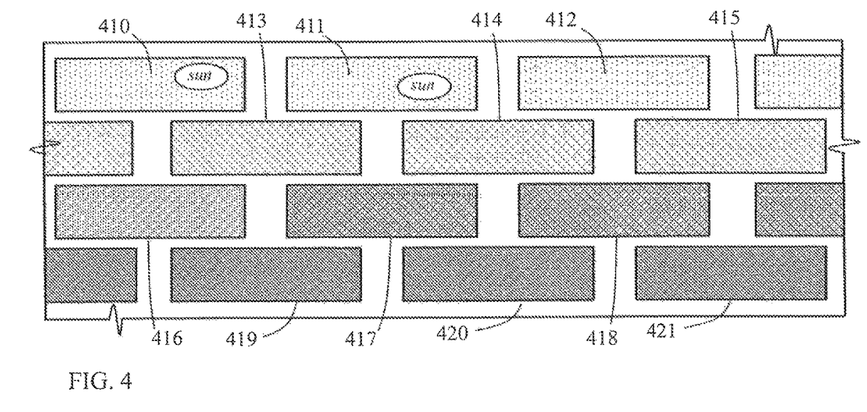
FIG. 4 is a view of the array of heliostat mirrors as seen from a camera mounted on the receiver, in accordance with the preferred embodiment of the present invention.

Illustrated in FIG. 4 is a representative image of the heliostat field 210 as seen from one of the plurality of cameras 210-213. The image includes a plurality of heliostat mirrors 410-421, each mirror reflecting light from the sky. If the mirrors are not properly oriented to reflect light to the receiver, the intensity of the light seen in each mirror will generally differ depending on the angle from the sun. For mirrors 410-411 in which the sun appears in the reflection, the light intensity for the mirror is very high. For other mirrors 419-421 that are angled far from the sun, the light intensity is relatively low and the sky appearing relatively dark. If all the mirrors are "off sun" and not reflecting light to the receiver aperture, the mirrors 410-421 will generally reflect varying degrees of light, as indicated by the different levels of greyscale used in the illustration.

Figure 5:
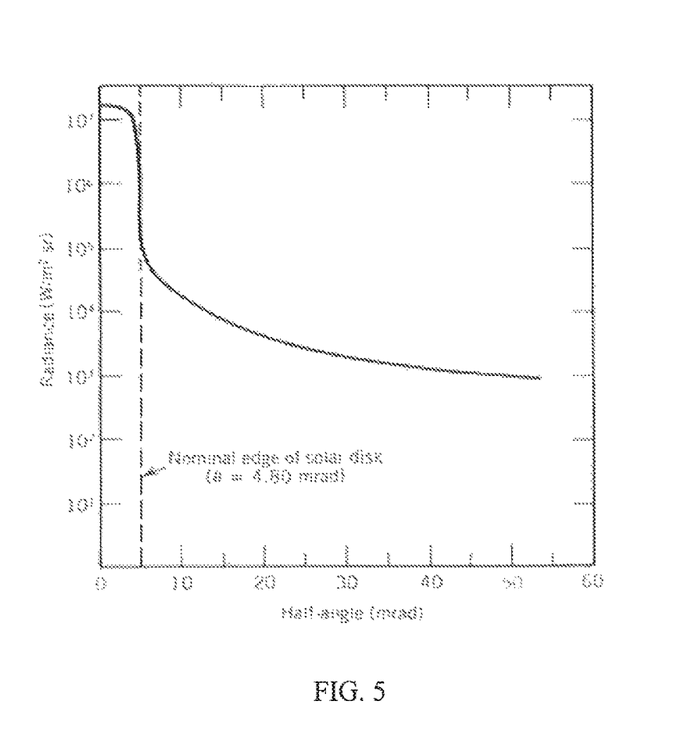
FIG. 5 is a graph of the intensity of light as a function of the angular distance from the sun.

The actual intensity of light observed in the reflection from each mirror depends on the section of sky from which the light originates. As seen in FIG. 5, the light intensity is maximal for the angular range that coincides with the sun, where the center of the sun is defined to be the origin of the angular range. The intensity drops rapidly around the nominal edge of the sun. Beyond the nominal edge of the sun, the intensity is non-zero due to scattering effects. In particular, light from the sun is scattered by the atmosphere mostly by Rayleigh scattering and Mie scattering. Rayleigh scattering, which is wavelength dependent, produces omnidirectional scattering that produces a uniform or nearly uniform bluish illumination of the sky. Mie scattering, which is weakly wavelength dependent, produces scattering at smaller angles. Mie scattering results in a white halo around the sun with a brightness gradient that decreases with angle away from the sun. Radiation from the sun is also absorbed by the atmosphere at wavelengths corresponding to the various molecules it contains. These effects combine to produce a white light intensity gradient that gradually reduces as the angular distance from the sun increases. This "off-sun" light gradient is used in the present invention for solar tracking, as explained in detail below.

Figure 6:
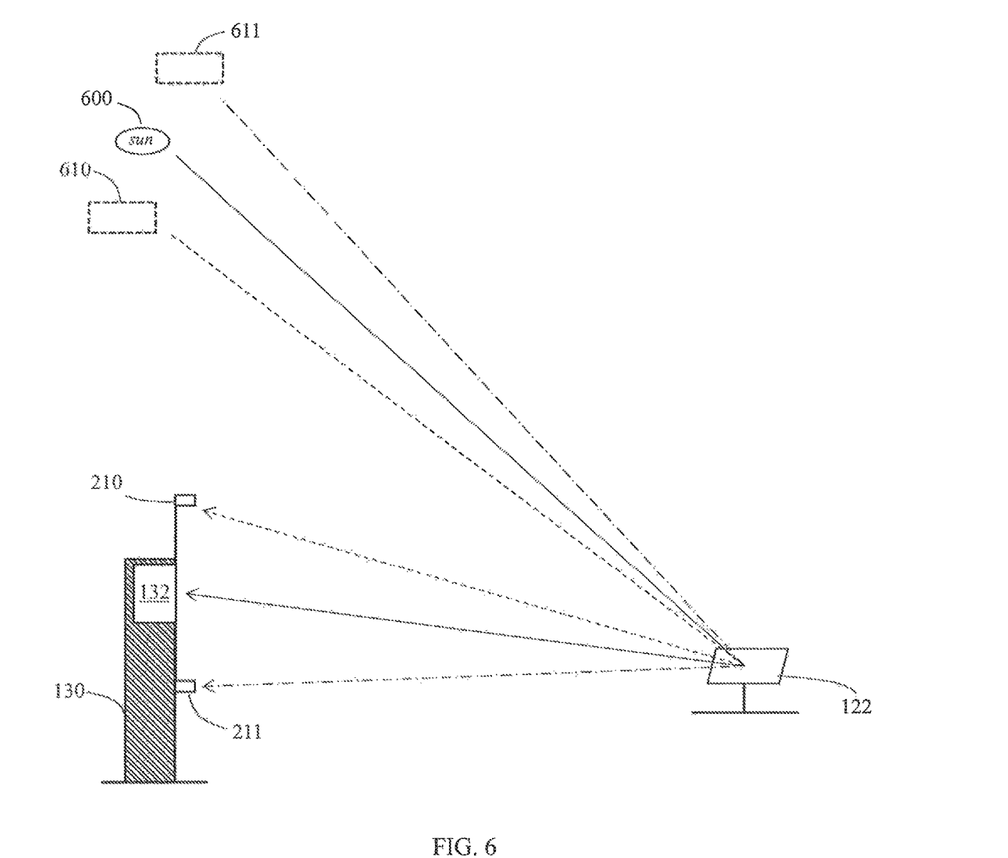
FIG. 6 is a cross section of the solar thermal receiver, in accordance with the preferred embodiment of the present invention.

Illustrated in FIG. 6 is a cross section of the solar thermal receiver showing the source of light incident on the receiver and cameras 210-211. When the heliostat mirror 122 is properly oriented, the light from the sun 600 is reflected onto or into the receiver aperture 132. At the same time, light is captured by cameras 210, 211. Due to the offset between the aperture and cameras, however, the light captured at the cameras originates from sections of the sky adjacent to the sun. In the preferred embodiment, the distance between the cameras 210, 211 and the aperture is large enough to ensure that the cameras never image the sun in the reflection from the heliostat mirror 122 while tracking. If the sun was visible in the images, the intensity of the light would likely saturate the camera and throw off the tracking computation.

As a result of the camera offset, upper camera 210 receives a reflection of light that originates from a section 610 of the sky below the sun 600, i.e., a solid angle at a lower elevation angle than the sun. From the same heliostat mirror, the lower camera 211 receives a reflection of light that originates from a section 611 of the sky above the sun 600. Although not shown, one skilled in the art will appreciate that the left camera 212 receives a reflection of light that originates from a section of the sky to the right of the sun 600, while the right camera 213 receives a reflection of light that originates from a section of the sky to the left of the sun 600 for the same heliostat mirror.

Figure 7:
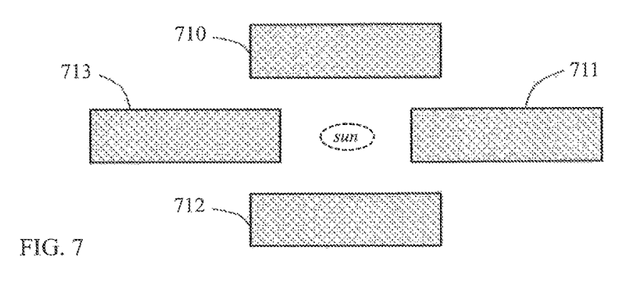
FIG. 7 is a compilation of four images of one heliostat mirror, in accordance with the preferred embodiment of the present invention.

When the images of the sky from the four cameras—as seen in one heliostat mirror—are compiled into a map of the sky, the four images reside at four different angles around the sun, which is illustrated in FIG. 7. When the mirror is properly oriented to reflect light on the aperture and the sun substantially bisects the angle between the two cameras, the intensity of light measured in the mirror by the upper and lower cameras is substantially the same. Similarly, the intensity of light measured in the mirror by the left and right cameras is the same. However, when the mirror is not properly oriented to reflect light on the aperture, the sun does not bisect the angle between the two cameras and the intensity of light measured in the mirror by opposing cameras (e.g., upper and lower cameras, or left and right cameras) is not the same.

Figure 8:
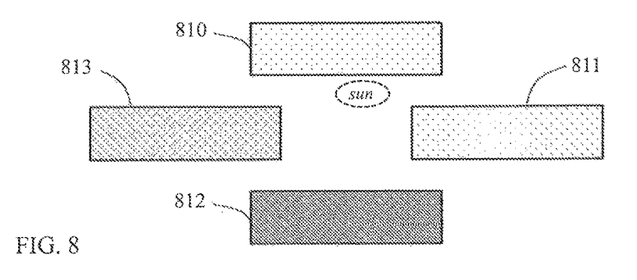
FIG. 8 is a compilation of four images of one heliostat mirror, in accordance with the preferred embodiment of the present invention.

As illustrated in FIG. 8, the light intensity of the sky adjacent to the sun is used to track the sun, in the present invention. While tracking the sun, the tracking controller monitors light levels for a plurality of mirrors, and determines if there is an imbalance in the light intensity for two opposing cameras. If a reflection of the sun from one mirror is diverted away from the center of the receiver aperture and biased toward a particular camera, the light intensity for that mirror will appear brighter in that camera than the camera on the opposite side of the aperture. This scenario is shown in FIG. 8 where the camera that acquired the image 810 of a heliostat is closer to the sun's reflection than the camera that acquired the image 812 of the same heliostat. As such, the light intensity for the particular heliostat appears brighter in image 810 than image 812. In response, the tracking controller, re-orients the heliostat mirror to direct sunlight at a lower elevation angle so that the light intensity is the same in heliostat image 810 as image 812, which causes the sun's reflection to be vertically centered on the receiver aperture. The analogous tracking procedure is used to adjust heliostat azimuth angle using the light intensities measured in the left and right camera images 813, 811. When the proper azimuth angle is achieved, the light intensity observed in left and right cameras is balanced and the reflected sunlight is horizontally centered on the receiver aperture.

Figure 9:
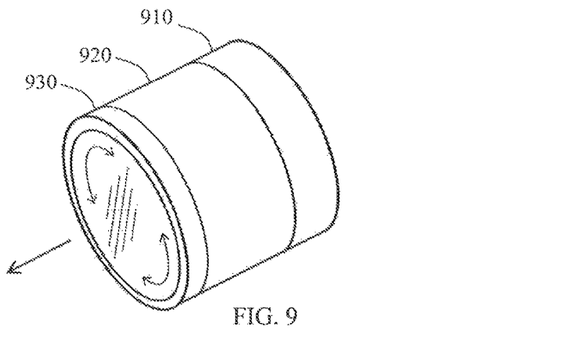
FIG. 9 is a perspective view of a camera with a rotating polarizer, in accordance with the preferred embodiment of the present invention.
Figure 10:
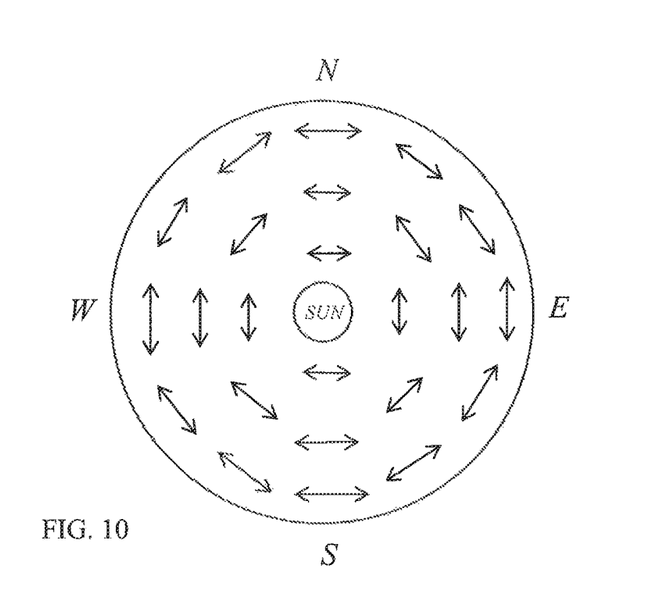
FIG. 10 is a map of light polarization around the sun.

In some embodiments of the present invention, the tracking controller tracks the sun based on solar polarization as well as light intensity. Polarization is determined using receiver-mounted cameras 210-213 in the form of camera assembly 900, as shown in FIG. 9. This camera assembly 900 includes a camera base 910 with charge-couple device (CCD) imager, an optical lens housing 920, and a rotating polarizer 930. The polarizer is configured to automatically rotate while images of the heliostat array are acquired. The maximum polarization is then used to determine a direction of the sun. As shown in FIG. 10, the polarization of sunlight is predominately tangential about the sun, and the strength of that tangential polarization increases with the angular distance from the sun.

In the preferred embodiment, the polarization for each mirror is determined for each image captured. The maximum polarization for a mirror is determined by identifying the image with the brightest light level while the polarizer 930 is rotated at least 180 degrees. The process of finding the maximum brightness is repeated for each for each mirror seen in each camera 210-213. The polarizer angle associated with the maximum brightness of a mirror is recorded for each of the four cameras 210-213. A radial line perpendicular to polarization angle is then generated to account for the fact that the polarization is tangential to the sun. The sun should then lie somewhere on the radial line. The radial line for each of the mirrors are superimposed and the position of the sun estimated based on the convergence of those radial lines. In the preferred embodiment, two or more polarization measurements are required to locate the position of the sun, but four measurements are used here for increased accuracy.

Figure 11:
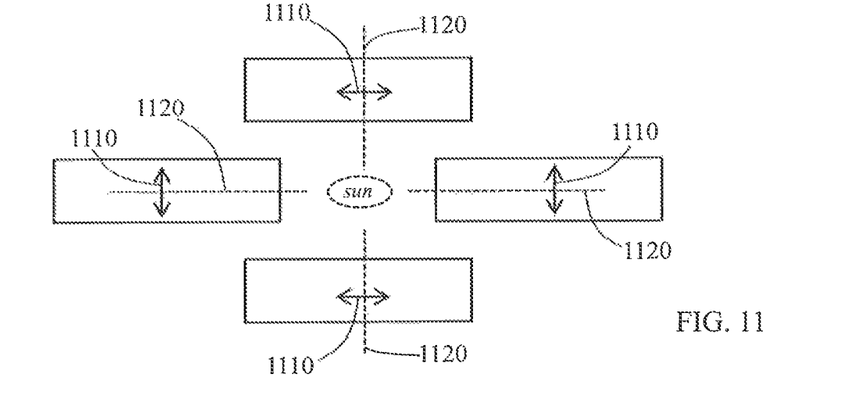
FIG. 11 is a compilation of light polarization as viewed in four images of one heliostat mirror, in accordance with the preferred embodiment of the present invention.
Figure 12:
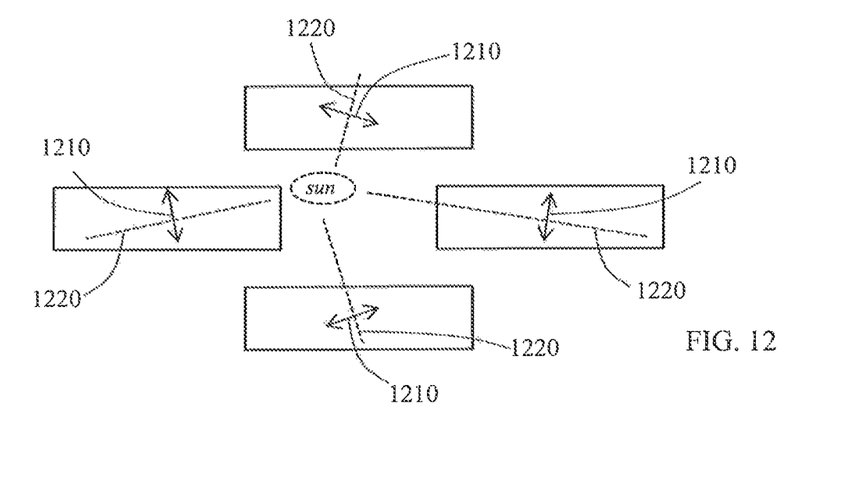
FIG. 12 is a compilation of light polarization as viewed in four images of one heliostat mirror, in accordance with the preferred embodiment of the present invention.

Referring to FIG. 11, the polarization of sunlight is measured for the same heliostat in the four cameras 210-213. The polarization angles 1110 are then used to generate the four radial lines 1120, which converge to indicate the position of the sun centered between the mirror images. In another example in FIG. 12, the polarization of sunlight 1210 is measured, the four radial lines 1220 generated, and the position of the sun determined to be off-center. At this point, the tracking controller issues commands to reorient the associated mirror in the proper position to reflect sunlight to the receiver aperture, In some embodiments, the off-sun light intensity tracking procedure of FIGS. 7-8 is combined with the polarization tracking procedure of FIGS. 11-12 to enhance the accuracy of the estimate of the sun's position as well as accuracy of the tracking procedure.

Some embodiments of the present invention, the tracking controller selectively uses the red end of the optical spectrum in order to increase the signal-to-noise ratio of images used for light gradient tracking. The red wavelengths can be isolated using cameras with optical filters or by adjusting the gain values for RGB (red, green, blue) components of the images using image processing software. Red wavelengths are preferred because they are less susceptible to Rayleigh scattering than blue wavelengths. Also, the blue wavelengths, which have been scattered out of the direct beam to a greater extent than red wavelengths, make up a lower portion of the Mie scattered light that forms the gradient observed in the tracking images.

In some embodiments of the present invention, the tracking controller determines the position of the sun based, at least in part, on the ratio of colors of light or the ratio of spectra of light. In one embodiment for example, the tracking controller determines the intensity of white light and the intensity of blue light corresponding to each mirror as viewed by each of the four cameras 210-213. White light intensity drops off rapidly as a function of the angular distance from the edge of the sun, while blue light is substantially uniform. The tracking controller then determines the ratio of white light intensity to blue light intensity for each mirror as viewed by each of the four cameras. For a given mirror, if this white/blue ratio is the same for two opposing cameras (top and bottom, or left and right) on either side of the aperture, then the reflected sunlight is centered on the receiver aperture. If however, the ratio is different for the opposing cameras, then the sunlight is being directed to a spot closer to the camera observing the higher ratio. In response, the tracking controller adjusts the orientation of the mirror to direct the reflected sunlight to a point substantially between the two cameras to achieve a uniform ratio of white/blue light between the two opposing cameras. This ratio may be used to track the sun in both elevation and azimuth angles.

In the embodiment described above, the tracking controller orients the mirrors based on the ratio of white light intensity to blue light intensity. In other embodiments, the ratio is a function of the red and/or green light intensity and blue light. The intensity of red light will be highest at an angle near the sun and drop off rapidly as the angular distance from the sun increase. When referring to white, red, green, and blue light herein, one skilled in the art will appreciate that these terms refer to a spectrum of light where white is broad spectrum and red, green, and blue are narrow spectrum.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A solar tracking system for directing reflected sunlight from at least one heliostat mirror to a receiver aperture, the solar tracking system comprising:
   at least two cameras including a first camera comprising a first polarizer and a second camera comprising a second polarizer; and
   a tracking controller configured to;
      control the first polarizer to polarize, at a plurality of angles, sunlight from the at least one heliostat received at the first camera;
      control the second polarizer to polarize, at a plurality of angles, sunlight from the at least one heliostat received at the second camera;
      determine an intensity of the polarized light at each of the plurality of angles for the first and second cameras;
      determine, for the first and second cameras, an angle associated with a maximal intensity of polarized light;
      generate, for the first and second cameras, a radial line based on the orientation of maximal intensity of polarized light;
      determine a position of the sun based on the radial lines generated for the first camera and second camera; and
      re-orient the at least one heliostat mirror based on the determined position of the sun.

2. The solar tracking system of claim 1, wherein the first camera and second camera are configured to capture images of polarized light received from at least one heliostat mirror.

3. The solar tracking system of claim 2, wherein the first camera and second camera are the same distance from the receiver aperture.

4. The solar tracking system of claim 3, wherein the receiver aperture is interposed between the first camera and second camera.

5. The solar tracking system of claim 4, wherein the receiver aperture, the first camera, and the second camera are aligned along a horizontal line to determine an azimuth angle of the at least one mirror.

6. The solar tracking system of claim 5, further comprising a third camera and a fourth camera.

7. The solar tracking system of claim 6, wherein the receiver aperture, the third camera, and the fourth camera are aligned along a vertical line to determine an elevation angle of the at least one mirror.

8. The solar tracking system of claim 2, wherein the tracking controller is further configured to:
   determine, for both the first and second cameras, an intensity of a first spectrum received from the at least one heliostat mirror;
   determine, for both the first and second cameras, an intensity of a second spectrum received from the at least one heliostat mirror;
   determine, for the both first and second cameras, a ratio of the first spectrum and the second spectrum; and
   re-orient the at least one heliostat mirror based on a difference of the ratios corresponding to the first camera and the second camera.

9. The solar tracking system of claim 8, wherein the first spectrum corresponds to white light, and the second spectrum corresponds to blue light.

10. A method of tracking the sun in a solar tracking system configured to direct reflect sunlight from at least one heliostat mirror to a receiver aperture, the method comprising:
   polarizing, at a plurality of angles, sunlight from the at least one heliostat mirror received at a first camera;
   polarizing, at a plurality of angles, sunlight from the at least one heliostat mirror received at a second camera;
   determining, an intensity of the polarized light at each of the plurality of polarization angles for the first camera and second camera;
   determining, for the first camera, an angle of maximal intensity of polarized light;
   determining, for the second camera, an orientation of maximal intensity of polarized light;
   generating, for the first and second cameras, a radial line based on the orientation of maximal intensity of polarized light;
   determining a position of the sun based on the radial lines generated for the first camera and second camera; and
   re-orienting the at least one heliostat mirror based on the determined position of the sun.

11. The method of tracking the sun in claim 10, wherein the first camera and second camera are the same distance from the receiver aperture.

12. The method of tracking the sun in claim 11, wherein the receiver aperture is interposed between the first camera and second camera.

13. The method of tracking the sun in claim 12, further comprising re-orienting the at least one heliostat mirror based, in part, on light intensity as determined by the first and second cameras.

14. The method of tracking the sun in claim 13, wherein the light intensity comprises an intensity of white light and blue light.

15. A solar tracking system comprising:
   at a plurality of cameras, each camera comprising a polarizer; and
   a tracking controller configured to:
      for each of the plurality of cameras:
         control the respective polarizer to polarize sunlight from at least one heliostat mirror at a plurality of angles;
         determine an intensity of the polarized light at each of the plurality of angles;
         identify one of the plurality of angles associated with a maximal intensity of polarized light;
         generate a radial line based on the angle of maximal intensity of polarized light;
      determine a position of the sun based on the radial line generated for each of the plurality of cameras; and
      re-orient the solar tracking system based on the determined position of the sun.

16. The solar tracking system in claim 15, wherein generate a radial line based on the angle of maximal intensity of polarized light comprises:
   generate a radial line perpendicular to the angle of maximal intensity of polarized light.

17. The solar tracking system in claim 16, wherein determine a position of the sun based on the radial line generated for each of the plurality of cameras comprises:
   determine a position of the sun based on intersections of the radial line generated for each of the plurality of cameras.

18. The solar tracking system in claim 17, further comprising a receiver with an aperture.

19. The solar tracking system of claim 18, wherein the plurality of cameras are disposed around the receiver aperture at equal distances from the receiver aperture.

20. The solar tracking system of claim 19, wherein the plurality of cameras comprises:
- a first camera and second camera aligned with the receiver aperture along a horizontal line to determine an azimuth angle of the solar tracking system; and
- a third camera and fourth camera aligned with the receiver aperture along a vertical line to determine an elevation angle of the solar tracking system.

* * * * *